US012509891B2

(12) United States Patent
Wall et al.

(10) Patent No.: US 12,509,891 B2
(45) Date of Patent: Dec. 30, 2025

(54) VENT FOR A VENTILATED CONCRETE FLOOR STRUCTURE AND METHOD OF FORMING A VENTILATED CONCRETE FLOOR STRUCTURE

(71) Applicant: Kroeker Farms Limited, Winkler (CA)

(72) Inventors: John Wall, Winkler (CA); Robert Friesen, Winkler (CA); Dennis Wayne Rempel, Winkler (CA); Harwin James Bouwman, Winkler (CA)

(73) Assignee: Kroeker Farms Limited, Winkler (CA)

( * ) Notice: Subject to any disclaimer, the term of this patent is extended or adjusted under 35 U.S.C. 154(b) by 328 days.

(21) Appl. No.: 18/332,232

(22) Filed: Jun. 9, 2023

(65) Prior Publication Data

US 2024/0410187 A1 Dec. 12, 2024

(51) Int. Cl.
*E04G 15/06* (2006.01)
*A01F 25/22* (2006.01)

(52) U.S. Cl.
CPC ............ *E04G 15/061* (2013.01); *A01F 25/22* (2013.01)

(58) Field of Classification Search
None
See application file for complete search history.

(56) References Cited

U.S. PATENT DOCUMENTS 3,442,058 A * 5/1969 Naslund ............ E04F 15/02429 52/505
3,864,888 A * 2/1975 Tupper .................... E04B 5/261 52/127.2
4,715,155 A * 12/1987 Holtz ........................ E04B 5/29 52/654.1
7,281,357 B2 * 10/2007 Femminella .............. E04B 5/36 52/334
7,779,590 B2 * 8/2010 Hsu ........................... E04B 5/40 52/328
8,375,661 B1 * 2/2013 diGirolamo ............... E04B 5/10 52/223.13
8,661,754 B2 * 3/2014 Hsu ......................... E04C 3/294 52/703
10,640,970 B2 * 5/2020 Sarda ...................... E04B 1/215
(Continued)

*Primary Examiner* — Gisele D Ford
(74) *Attorney, Agent, or Firm* — Adrian D. Battison; Ade & Company Inc.; Kyle R. Satterthwaite

(57) ABSTRACT

A vent for a ventilated concrete floor structure, which includes parallel spaced-apart support beams and a concrete floor thereover, comprises upstanding longitudinally-extending sidewalls interconnected in transversely spaced-apart relation and a passageway therebetween for releasing air from at least one air duct underneath the floor to a ventilated space thereover. The passageway has an inlet at bottoms of the sidewalls communicated with an air duct and an outlet at tops of the sidewalls at an upper surface of the floor. The sidewalls are metallic. Upright sidewall portions extend in a height direction of the vent and upper sidewall portions defining the sidewall tops extend transversely outwardly from the upright portions to provide upper surfaces arranged substantially flush with the upper floor surface. The passageway is substantially prismatic, and the rectangular inlet opening is wider than the rectangular outlet opening. Lower sidewall portions are configured to rest on the support beams.

20 Claims, 8 Drawing Sheets

(56) References Cited

U.S. PATENT DOCUMENTS

| | | | | |
|---|---|---|---|---|
| 2006/0075707 | A1* | 4/2006 | Cretti | E04B 5/04 52/414 |
| 2006/0251851 | A1* | 11/2006 | Bowman | B32B 27/08 428/339 |
| 2008/0000177 | A1* | 1/2008 | Siu | E04C 5/065 52/319 |
| 2013/0168041 | A1* | 7/2013 | Teron | E04C 2/525 165/49 |
| 2021/0189722 | A1* | 6/2021 | Place | E04B 5/10 |
| 2021/0302031 | A1* | 9/2021 | Weber | F24D 3/125 |
| 2022/0049495 | A1* | 2/2022 | Strong | E04B 5/48 |
| 2022/0061223 | A1* | 3/2022 | Micka | F24F 7/10 |
| 2023/0399845 | A1* | 12/2023 | De Haahn | E04B 5/10 |

* cited by examiner

VENT FOR A VENTILATED CONCRETE FLOOR STRUCTURE AND METHOD OF FORMING A VENTILATED CONCRETE FLOOR STRUCTURE

FIELD OF THE INVENTION

The present invention relates to a vent for a ventilated concrete floor structure and method of forming the same, and more particularly to such a device and method where the vent is formed from a pair of longitudinally elongated, upstanding and spaced apart sidewalls.

BACKGROUND

Ventilated concrete floor structures are commonly provided in ventilated commodity storage buildings which store crops for example potatoes. Generally speaking, the ventilated concrete floor structure is formed from a plurality of parallel spaced-apart beams, typically referred to as grade beams, between which are formed air channels for conveying ventilation air. A concrete floor is formed over the grade beams by casting in-situ, so as to form a concrete covering for the air channels to close the same between each adjacent pair of the beams, thereby forming air ducts. The floor is in the form of a pad. Vent devices are provided, embedded in the cast concrete floor during the casting process, to communicate the formed air ducts with a ventilated space over the concrete floor, which is enclosed by a peripheral wall and roof of the storage building.

Conventionally, vents in the floor are formed by laying wooden planks across openings cast into the floor covering or by plastic devices forming air passageways through the floor, which devices are imbedded in communication with the air channels. Some such devices, which act to form the openings during casting, may be removable when the concrete has cured, which leaves exposed concrete edges that are susceptible to chipping over time.

One shortcoming of such conventional vent devices is chipping of concrete around the vent devices due to an exposed edge of the concrete at a periphery of the convention vent device.

One shortcoming of plastic vent devices is deformation after installation due to pressure of unset concrete during casting. Deformation of such vents may also occur when debris becomes lodged under upper edges of the vents and between the same and the floor surface, as the upper edges are not secured to the cast concrete. This may in turn make the concrete floor prone to chipping around the vent device, when deformation acts to expose an edge of the concrete previously contiguous with the vent device.

Another shortcoming of plastic vent devices relates to an interior passageway thereof for releasing air from the air ducts. These passageways are conventionally funnel-shaped, with an inlet of the passageway sized smaller than an outlet thereof, which causes the vents to be difficult to clean when debris has become lodged or is otherwise received in the passageway, thereby obstructing flow of air through the passageway.

SUMMARY OF THE INVENTION

According to an aspect of the invention there is provided a vent for a ventilated concrete floor structure, wherein the ventilated concrete floor structure comprises a plurality of support beams in substantially parallel spaced apart relation on an underlying support surface, a cast concrete floor formed over the support beams and a plurality of air channels respectively between adjacent pairs of the support beams and arranged to be substantially covered by the concrete floor to form air ducts, the vent comprising:

- a pair of upstanding longitudinally-extending sidewalls interconnected in spaced-apart relation in a width direction of the vent crosswise to a longitudinal direction;
- a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;
- wherein the sidewalls have upright portions between the tops and the bottoms thereof and extending in the height direction therebetween;
- wherein the sidewalls are made of metallic material; and
- wherein the sidewalls include upper portions defining the tops thereof, wherein the upper portions extend outwardly from the upright portions in the width direction so as to provide upper surfaces at the tops of the sidewalls and beside the outlet opening that are arranged substantially flush with the upper surface of the cast concrete floor.

This provides an arrangement of vent which is configured to resist chipping of a surrounding portion of the cast concrete floor, which encompasses the vent, as the upper surfaces of the vent on either side of the outlet can be presented flush with the upper surface of the surrounding concrete floor.

Preferably, the upper portions are hooked so as to extend outwardly from the upright portions and then downwardly towards the bottoms of the sidewalls, such that upper terminal edges of the sidewalls defined by the upper portions are below the tops of the sidewalls. In this manner, the upper terminal edges of the device are embedded in the cast concrete floor. Also, these downwardly extending or depending portions of the upper portions of the sidewalls act as a shield to prevent catching of tools used during formation of the cast concrete floor.

According to another aspect of the invention there is provided a vent for a ventilated concrete floor structure, wherein the ventilated concrete floor structure comprises a plurality of support beams in substantially parallel spaced apart relation on an underlying support surface, a cast concrete floor formed over the support beams and a plurality of air channels respectively between adjacent pairs of the support beams and arranged to be substantially covered by the concrete floor to form air ducts, the vent comprising:

- a pair of upstanding longitudinally-extending sidewalls interconnected in spaced-apart relation in a width direction of the vent crosswise to a longitudinal direction;
- a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;

wherein the sidewalls have upright portions between the tops and the bottoms thereof and extending in the height direction therebetween;

wherein the sidewalls are made of metallic material; and wherein the sidewalls include upper portions defining the tops thereof, wherein the upper portions extend outwardly from the upright portions in the width direction so as to provide upper surfaces at the tops of the sidewalls and beside the outlet opening that are arranged substantially flush with the upper surface of the cast concrete floor;

wherein the upper portions are hooked so as to extend outwardly from the upright portions and then downwardly towards the bottoms of the sidewalls, such that upper terminal edges of the sidewalls defined by the upper portions are below the tops of the sidewalls.

This provides an arrangement of vent which is configured to resist chipping of a surrounding portion of the cast concrete floor, which encompasses the vent, as the upper surfaces of the vent on either side of the outlet can be presented flush with the upper surface of the surrounding concrete floor. Furthermore, the upper terminal edges of the device are embedded in the cast concrete floor. Also, these downwardly extending or depending portions of the upper portions of the sidewalls act as a shield to prevent catching of tools used during formation of the cast concrete floor or any debris from entering into a space between the upper surfaces and underlying concrete.

In the illustrated arrangement, when the upper portions comprise outwardly-extending portions extending substantially horizontally outwardly and depending portions extending therefrom and towards the bottoms of the sidewalls and when the depending portions define the upper terminal edges, the outwardly-extending portions define the upper surfaces of the sidewalls which are respectively planar and which lie in a common plane.

In the illustrated arrangement, when the upper portions comprise outwardly-extending portions extending substantially horizontally outwardly and depending portions extending therefrom and towards the bottoms of the sidewalls and when the depending portions define the upper terminal edges, transitions between the outwardly-extending portions and the depending portions are rounded such that outer surfaces of the upper portions between the outlet opening and the upper terminal edges, including the upper surfaces of the sidewalls, are curved.

In the illustrated arrangement, when the upper portions comprise outwardly-extending portions extending substantially horizontally outwardly and depending portions extending in the height direction towards the bottoms of the sidewalls and defining the upper terminal edges, heights of the depending portions in the height direction are about one-half of widths of the outwardly-extending portions in the width direction.

Preferably, the sidewalls include lower portions defining the bottoms thereof and extending outwardly from the upright portions in the width direction to form feet for resting on the support beams.

In one such arrangement, when the upper portions include outwardly-extending portions extending substantially horizontally from the upright portions and defining the upper surfaces of the sidewalls, the lower portions extend further horizontally outwardly than the upper portions from the upright portions.

Preferably, the passageway is substantially prismatic in shape such that the inlet and outlet openings are rectangular-shaped.

Preferably, the inlet opening is wider than the outlet opening in the width direction of the vent.

In the illustrated arrangement, the sidewalls are arranged to span an adjacent set of more than two support beams.

According to another aspect of the invention there is provided a vent for a ventilated concrete floor structure, wherein the ventilated concrete floor structure comprises a plurality of support beams in substantially parallel spaced apart relation on an underlying support surface, a concrete floor thereover and a plurality of air channels respectively between adjacent pairs of the support beams and arranged to be covered by the concrete floor to form air ducts, the vent comprising:

a pair of upstanding longitudinally-extending sidewalls interconnected in spaced-apart relation in a width direction of the vent crosswise to a longitudinal direction;

a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;

wherein the passageway is substantially prismatic in shape such that the inlet and outlet openings are rectangular-shaped; and wherein the inlet opening is wider than the outlet opening in the width direction.

This provides an arrangement of vent which is easier to clean by pushing debris in the passageway through the inlet and into the air duct for subsequent removal.

In the illustrated arrangement, the sidewalls are arranged to span an adjacent set of more than two support beams.

Preferably, the sidewalls have upright portions between the tops and the bottoms thereof and extending in the height direction therebetween; the sidewalls are made of metallic material; and the sidewalls include upper portions defining the tops thereof, wherein the upper portions extend outwardly from the upright portions in the width direction so as to provide upper surfaces at the tops of the sidewalls and beside the outlet opening that are arranged substantially flush with the upper surface of the cast concrete floor.

In such an arrangement, preferably, the upper portions are hooked so as to extend outwardly from the upright portions and downwardly towards the bottom of the sidewalls, such that upper terminal edges of the sidewalls defined by the upper portions are below the tops of the sidewalls.

Preferably, the sidewalls include lower portions defining the bottoms thereof and extending outwardly from the upright portions to form feet for resting on the support beams.

According to yet another aspect of the invention there is provided a method of forming a ventilated concrete floor structure, the method comprising:

providing, on an underlying support surface, a plurality of longitudinally-extending support beams with planar upper surfaces in substantially parallel relation to each other and spaced apart in a lateral direction crosswise to a longitudinal direction, wherein the upper surfaces of the support beams lie in a common plane to collectively define a common support surface for a concrete floor to be cast thereover;

providing a plurality of vents configured for releasing air from air channels formed between adjacent pairs of the support beams, wherein the vents are arranged to be elongated in the lateral direction and to span between an adjacent set of two or more of the support beams;

mounting the vents to the support beams in an array of the vents with the vents rested on the upper surfaces of the support beams, wherein in the array the vents are arranged at spaced positions from each other across the common support surface of the support beams;

arranging, on the support beams, between the vents, cladding configured to support the concrete floor, so as to close tops of the air channels to form air ducts; and casting the concrete floor on the cladding between the vents.

This provides fewer steps to forming the ventilated concrete floor structure, as the vents are mounted directly to the support beams, the upper surfaces of which are coplanar, and the cladding is placed directly on the support beams, such that these components by virtue of placing on the support beams are arranged level for concrete pouring.

Preferably, when the cladding is in the form of substantially uniform rectangular sheets, lengths of the vents are substantially equal to first dimensions of the rectangular sheets of the cladding.

Preferably, the vents, in the array, are arranged in a plurality of longitudinally extending rows.

Preferably, in such arrangements, arranging cladding on the support beams and between the vents comprises arranging a row of the sheets of the cladding between an adjacent pair of the vents in a common one of the rows of the array of the vents with the first dimensions of the sheets aligned relative to the vents. Thus the sheets of the cladding are laid as fabricated or manufactured or otherwise provided, without cutting to fit or accommodate the vents.

In one such arrangement, arranging cladding on the support beams and between the vents comprises overlapping the sheets of the cladding. This further reduces cutting such that the method of forming the ventilated concrete floor structure may be faster.

Preferably, the vents, in the array, are arranged in a plurality of longitudinally extending rows in which respective ones of the vents in each row are staggered relative to the vents of an adjacent one of the rows.

Preferably, the respective vents of adjacent rows of the array are arranged in non-overlapping condition relative to the lateral direction.

In the illustrated arrangement, the vents are arranged to span more than two adjacent support beams.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
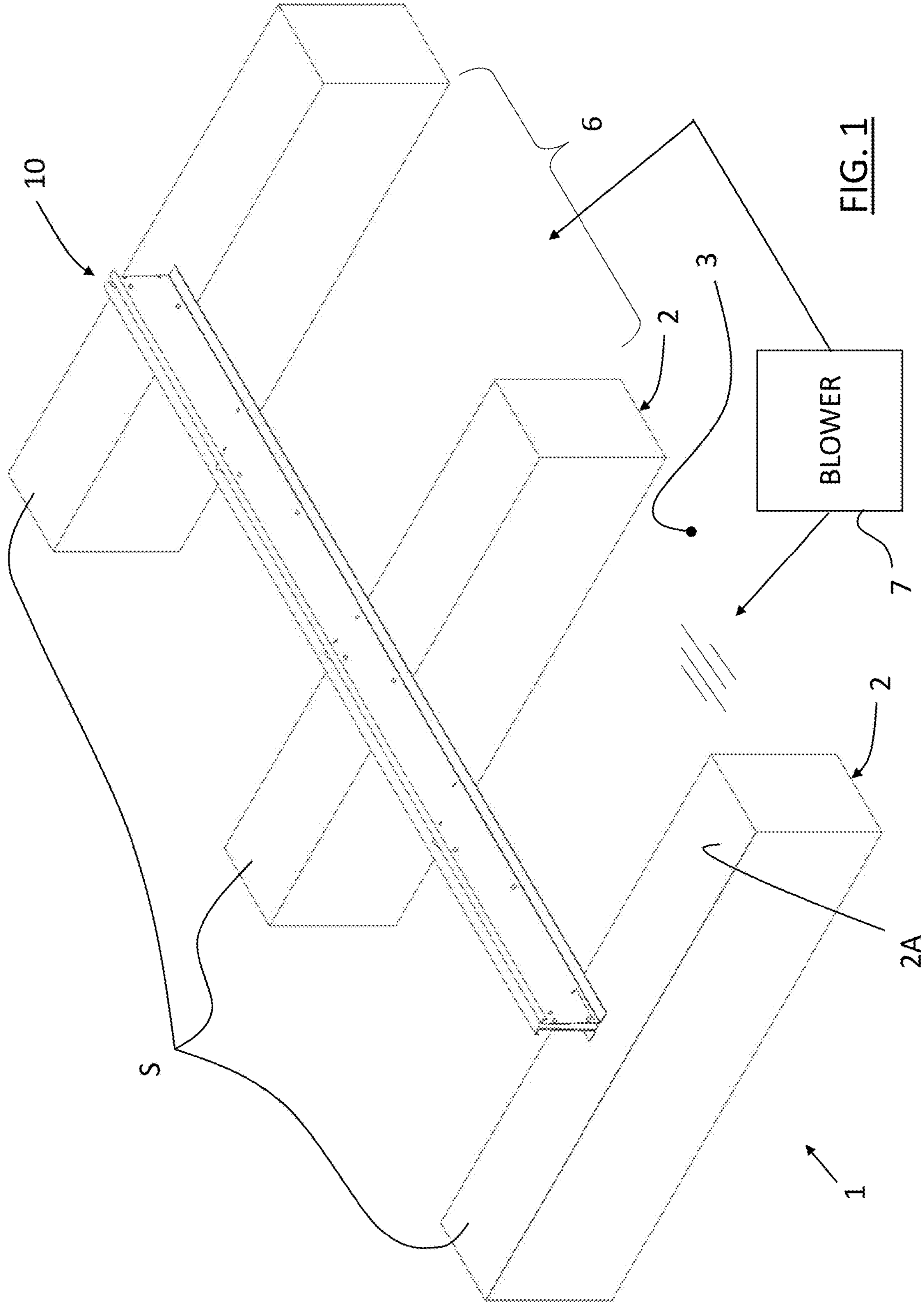
FIG. 1 is a perspective view of an arrangement of ventilated concrete floor structure according to the present invention, with some components, namely a concrete floor and cladding, omitted for clarity of illustration.
Figure 2:
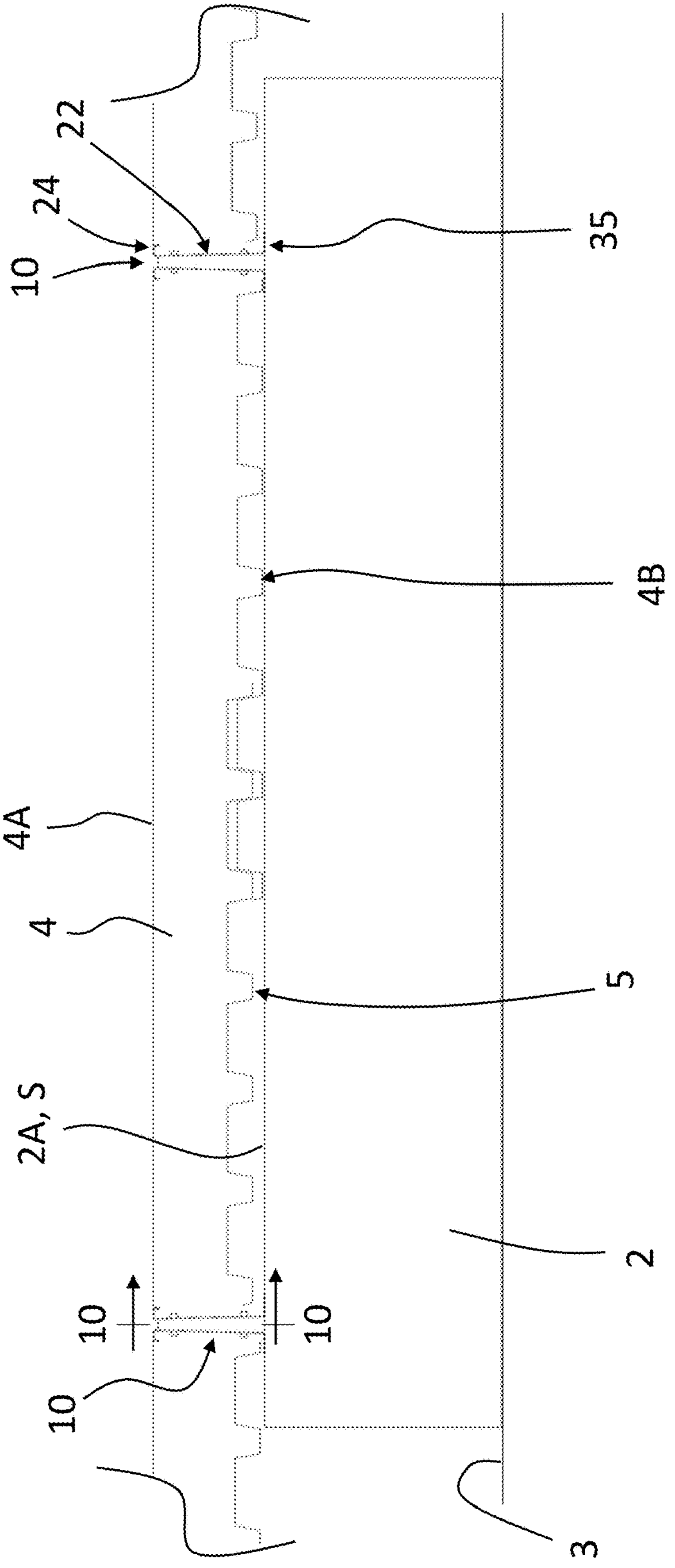
FIG. 2 is a partial side view of the ventilated concrete floor structure of FIG. 1.

Referring to the accompanying drawings there is shown a vent 10 for a ventilated concrete floor structure 1.

Generally speaking, the ventilated concrete floor structure 1 comprises a plurality of longitudinally-extending support beams 2 in substantially-parallel spaced-apart relation on an underlying support surface 3 such as that formed by a concrete pad. More specifically, the support beams 2 are arranged at laterally spaced positions, so as to be spaced apart in a lateral direction crosswise to a longitudinal direction of the beams, across the underlying support surface, so as to be arranged in an array, for example, in the form of a laterally-extending common row. The support beams 2 have planar upper surfaces 2A, opposite to the underlying support surface, which lie in a common plane, which typically is generally horizontal so as to be more horizontal than upright, so as to collectively define a common support surface S. The support beams 2 may be referred to in industry as grade beams. Typically, the support beams 2, too, are fabricated or cast in-situ or on site.

Furthermore, the floor structure 1 includes a concrete floor 4 over the support beams 2. The floor 4 is in the form of a pad which is substantially supported by the support beams 2. When the concrete floor is formed in-situ, as to be cast, cladding 5, which is configured to support the concrete floor, is typically provided to cover spaces between the support beams so that the poured concrete can span therebetween. In other words, tops of the support beams are cladded to bridge gaps therebewteen. Despite the cladding 5, the support beams 2 primarily bear the weight of the cast concrete floor so as to substantially support the same, even though the cladding may be disposed as an intermediate layer therebetween. Typically, the cladding is made from metallic material and is provided in the form of distinct sheets, so as to be planar, and usually of uniform rectangular (peripheral) shape so as to be of uniform size and shape. In the illustrated arrangement, the sheets of metallic cladding are corrugated so as to have a sinusoidal or wavy cross-section for strengthening the sheets.

The concrete floor 4 has an upper surface 4A defining a support surface for articles or items placed thereon, which is typically interior to a building; an underside 4B and a thickness between the upper surface 4A and the underside 4B. When the concrete floor is formed in-situ, and when cladding 5 is arranged on the support beams to bridge the spaces or gaps therebetween, the underside 4B of the concrete floor conforms to the cladding 5. Typically, the upper surface 4A of the concrete floor is planar and substantially horizontally oriented.

Typically, the concrete floor 4 is reinforced so as to have embedded therein a grid-like array of metallic reinforcing bars (not shown). The reinforcing bars are supported on the cladding and the grid thereof spans a majority of the area of the floor pad.

Moreover, the ventilated concrete floor structure 1 includes a plurality of air channels 6 respectively between adjacent pairs of the support beams, and preferably there is an air channel between each adjacent pair of the support beams. The air channels 6 are arranged to be substantially covered by the concrete floor 4 to form air ducts. As such, the air channels 6 are delimited by sides 2B of the adjacent pair of the support beams, which face each other, and on a bottom or base thereof by the underlying support surface 3. Accordingly, the air ducts are further delimited on top, opposite to the base, by the concrete floor 4 which is typically underlaid by cladding 5 when the floor is formed in-situ. The air ducts 6, either respectively or collectively as a system, are closed such that air input to the channels or network of the channels is substantially the same as the air output or released through the vents to the ventilated space. If at least some of the air ducts are independently fluidically communicated with the blower 7 from other ones or subsets of the air ducts, then the air ducts are closed at least at one end thereof, adjacent one of longitudinally opposite ends 2C of the support beams, for example by a footing or by walls of an excavated space in which the support beams are received arranged at the end 2C.

Yet further, the ventilated concrete floor structure 1 typically also includes a blower 7 (schematically shown) in operative communication with the air ducts and configured to move air therethrough for release, via vents such as those respectively indicated at 10, to a ventilated space over the concrete floor 4. For example, there may be provided one or more blowers connected through one or plural manifolds to the air ducts.

To pass air conveyed by the air channels and to a space over the concrete floor 4, the ventilated concrete floor structure 1 includes a plurality of vents 10 configured for releasing air from the air channels, in that each of the vents forms a passageway 12 for communicating at least one of the air channels 6 with the space over the concrete floor 4 which is consequently ventilated. The vents 10 are arranged to be elongated in the lateral direction relative to the support beams 2 and to span between an adjacent set of two or more of the beams. In the illustrated arrangement, the vents 10 are arranged to span more than two adjacent support beams, in this case three, thereby each fluidically communicating two air ducts with the ventilated space. Furthermore, a set of the vents installed in the ventilated concrete floor structure is arranged in a spaced array across the array of support beams 2, in which the vents are at spaced positions on the common support surface S of the support beams.

Turning now in more detail to the vents 10, each vent 10 generally comprises a pair of upstanding longitudinally-extending sidewalls 14 interconnected in spaced-apart relation in a width direction of the vent, which is crosswise to the longitudinal direction of the vent. The sidewalls 14 have longitudinally opposite ends 15 and laterally opposite sides 16 and 17. Since the sidewalls are oriented to be longitudinally elongated in a generally horizontal direction, and since the sidewalls are oriented in upright relative to the sides 16, 17, the laterally opposite sides form bottoms of the sidewalls, in this case associated with sides 16, and tops of the sidewalls, in this case associated with sides 17.

Further to the sidewalls, the vent 10 comprises the passageway 12 between the interconnected sidewalls for releasing air from at least one of the air ducts and to a ventilated space over the concrete floor. The passageway 12 has an inlet opening 19 at the bottoms 16 of the interconnected sidewalls 14 and arranged to be communicated with the one or more of the air ducts and an outlet opening 20 at tops 17 of the interconnected sidewalls arranged above the bottoms 16 thereof relative to a height direction of the vent, crosswise to the width and longitudinal directions. The tops 17 of the sidewalls are arranged at the upper surface 4A of the cast concrete floor 4. The bottoms 16 are arranged to rest on the support beams 2. Thus, the height of the vent between a top thereof defined by the sidewall tops 17 and a bottom thereof defined by the sidewalls bottoms 16 is substantially equal to the thickness of the concrete floor 4.

To be upstanding, the sidewalls 12 have upright portions 22 between the tops 17 and the bottoms 16 thereof and extending in the height direction therebetween. The upright portions 22 constitute majority portions of the sidewalls with respect to dimensions of constituent portions of the sidewalls, particular when measured crosswise to length between the sidewall ends 15.

To resist pressure of unset concrete during casting, the sidewalls 14 are made of metallic material, and preferably that which is corrosion resistant, for example stainless steel. Thus, the vent 10 may resist deformation during casting of the concrete floor, so as to retain size and shape of the passageway 12 for sufficient airflow and satisfactory cleaning of debris, the latter of which will be better appreciated later.

Further to the upright portions 22, the sidewalls 14 include upper portions 24 defining the tops thereof 20. The upper portions 24 extend outwardly from the upright portions 22 in the width direction so as to provide upper surfaces 27 at the tops 17 of the sidewalls and beside the outlet that are arranged flush with the upper surface 4A of the cast concrete floor. Also, the upper portions 24 define upper terminal edges 28 of the sidewalls which accordingly are spaced outwardly, relative to the width direction, from the upright sidewall portions 22.

Thus, the upper portions 24 of the sidewalls provide external surfaces of the vent available to be partially covered by concrete of the surrounding cast concrete floor so that the tops 17 of the sidewalls defining a top of the vent device is flush with the upper surface of the concrete floor.

To enhance imbedding of the vent 10 in the cast concrete floor 4, the upper portions 24 are hooked so as to extend outwardly from the upright portions 22 and then downwardly towards the bottoms 16 of the sidewalls, such that the upper terminal edges 28 of the sidewalls are below the sidewall tops 17. In this manner, end portions of the upper portions defining the upper terminal edges are embedded in the cast concrete floor 4. Also, these downwardly extending or depending portions of the upper portions of the sidewalls act as a shield to prevent catching of tools used during formation of the cast concrete floor on outwardly-extending portions of the sidewalls, which may cause inadvertent lifting of the vent from unset concrete.

More specifically, the downwardly hooked upper portions 24 of the sidewalls comprise outwardly-extending portions 30A extending substantially horizontally outwardly from the upright portions 22 and depending portions 30B extending from the outwardly-extending portions and towards the bottoms 16 of the sidewalls. The outwardly-extending portions 30A define the upper surfaces 27 of the sidewalls which are respectively planar and which lie in a common plane P. Typically, this plane P is arranged coplanar with the upper surface 4A of the concrete floor which is also planar.

It will be appreciated that the outwardly-extending portions 30A extend substantially horizontally outwardly in that they extend horizontally from the upright portions in a manner to be parallel with the surrounding upper surface of the concrete floor.

Additionally, transitions between the outwardly-extending portions 30A and the depending portions 30B are rounded such that outer surfaces of the upper portions 24 between the outlet opening and the upper terminal edges 28, including the upper surfaces 27 of the sidewalls, are curved. More specifically, the upper surfaces 27 are planar and outwardly-facing side surfaces 33 of the depending portions 30B are planar, but since the transition therebetween is rounded, the outer surface of each upper portion may be regarded as curved in a general sense.

Thus, the upper portions 24 are integrally formed with the upright portions 22 including two bends to respectively form the outwardly-extending portions 30A and the depending portions 30B.

In the illustrated arrangement, heights of the depending portions 30B in the height direction, that is between the upper terminal edges 28 and the upper surfaces 27 of the outwardly-extending portions 30A, are about one-half of widths of the outwardly-extending portions in the width direction, that is from interior faces 22A of the upright portions 22 at the tops 17 to the outer surfaces 33 of the depending portions 30B.

To be self-standing on the support beams, the sidewalls 14 include lower portions 35 defining the bottoms thereof 17 and extending outwardly from the upright portions 22 in the width direction to form feet for resting on the upper surfaces of the support beams. Thus, the feet are in forms of flanges integrally formed with the upright portions 22. In the illustrated arrangement, the flanges are planar and form with the upright portions interior edges at the inlet opening.

The lower portions 35 extend further horizontally outwardly than the upper portions 24 from the upright portions such that lower terminal edges 37 defined by the lower portions, which are spaced from the upright portions 22, are located farther from a central upstanding plane C than the upper terminal edges 28.

Figures 5, 6:
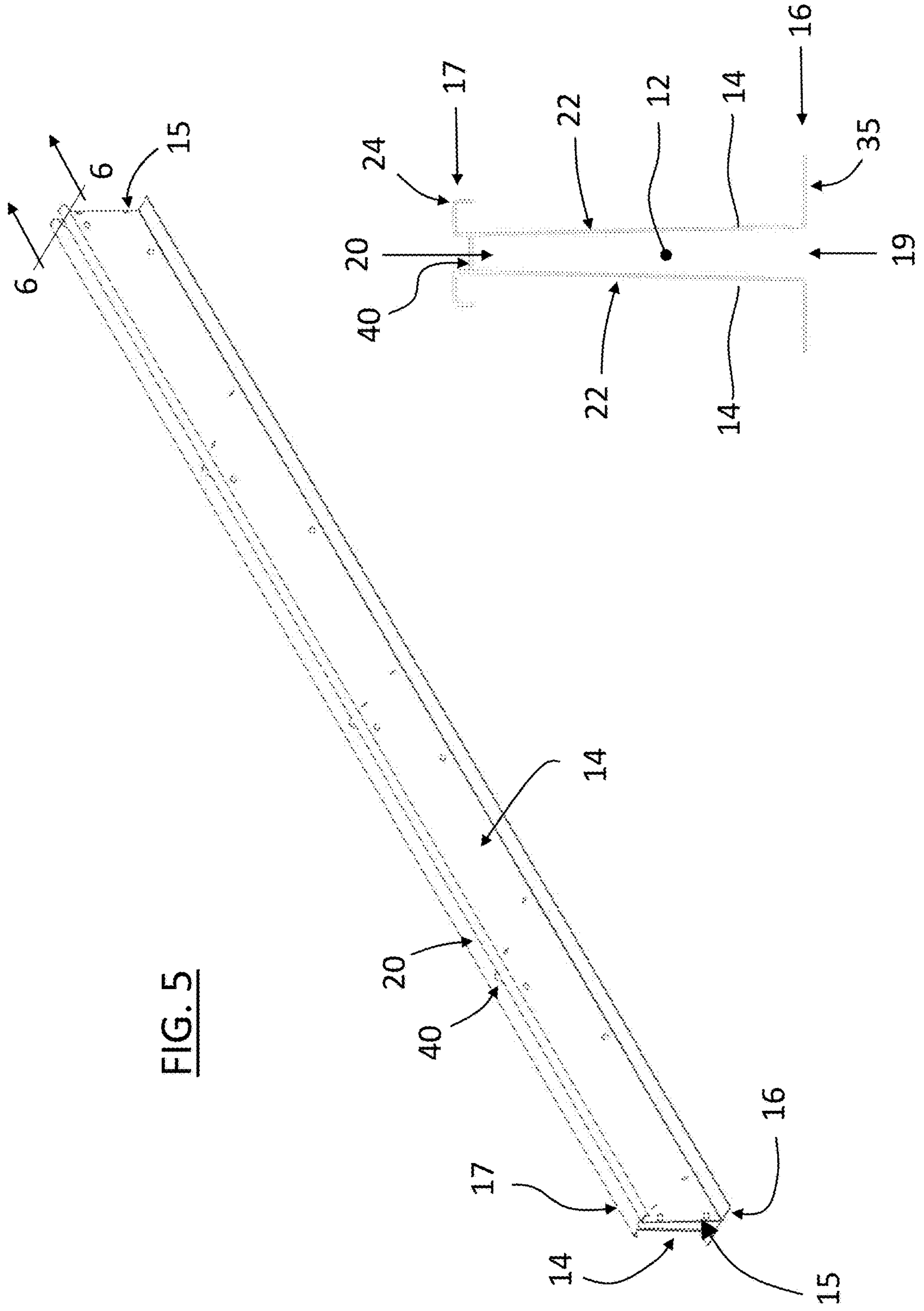
FIG. 5 is a perspective view of an arrangement of vent according to the present invention, which is implemented in the arrangement of ventilated concrete floor structure of FIG. 1.
FIG. 6 is a cross-sectional view along line 6-6 in FIG. 5.
Figure 8:
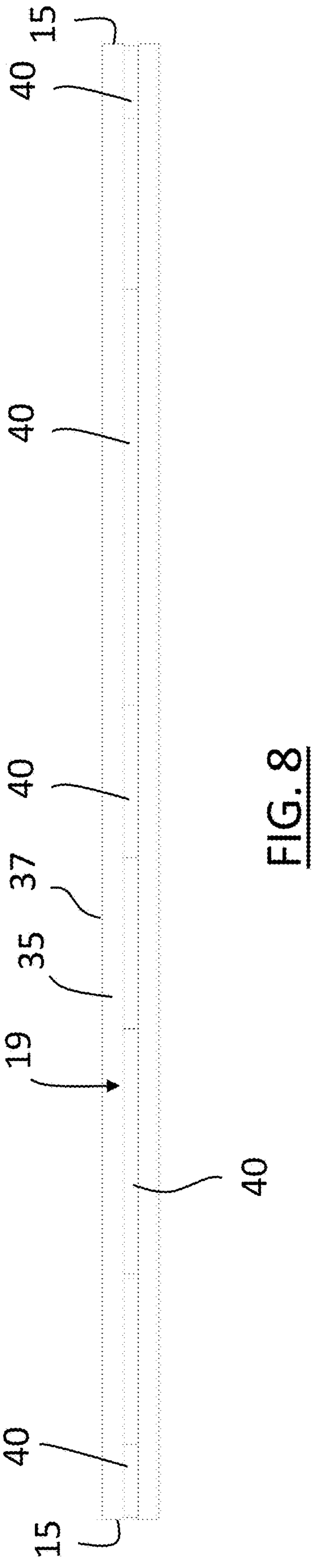
FIG. 8 is a bottom view of the vent of FIG. 5.
Figure 9:
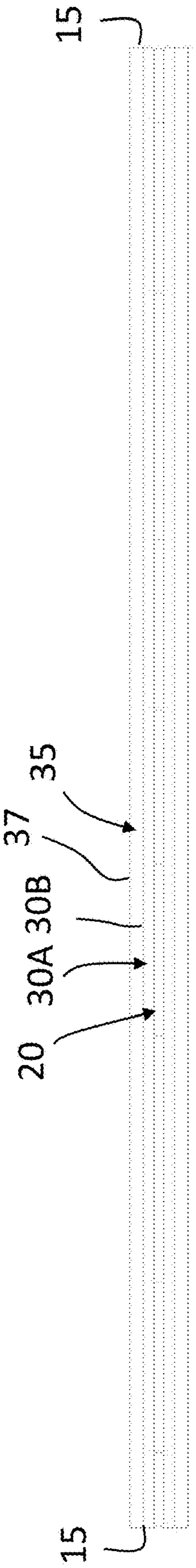
FIG. 9 is a top view of the vent of FIG. 5.

To facilitate cleaning of the passageway 12, the passageway is substantially prismatic in shape (as more clearly shown in FIG. 6) such that the inlet and outlet openings 19, 20 are rectangular-shaped as more clearly shown in FIGS. 8 and 9. More specifically, since the sidewalls 14 are elongated in the respective longitudinal direction of the vent relative to the height direction, the inlet and outlet openings 19, 20 are slot-shaped so as to be elongated in the respective longitudinal direction of the vent.

Furthermore, the inlet opening 19 is wider than the outlet opening 20 in the width direction of the vent. Thus, the passageway 12 diverges in the width direction from the top to the bottom of the vent, or in other words, the passageway 12 converges in the width direction from the bottom to the top of the vent. Thus, any lodged debris that has entered into the passageway 12 from the outlet opening 20 may be pushed through and out of the inlet opening 19 to the air duct 6 below for subsequent removal.

In the illustrated arrangement, to provide the tapered width of passageway 12 from the inlet to the outlet thereof, the upright portions 22 of the sidewalls are oriented in converging inclined orientation to each other. The upright portions 22, like the constituent portions of the upper portions 24 and the lower portions 35, are respectively planar.

Since the upright portions 22 are inclined, but are more upright than horizontal so as to be in upstanding orientation, the lower portions 35 form slightly obtuse interior angles with the upright portions 22, while the substantially horizontal outwardly-extending portions 30A of the upper portions form slightly acute interior angles with the upright portions 22.

To provide the prismatic passageway, the sidewalls 12 are oriented parallel to each other.

Figure 3:
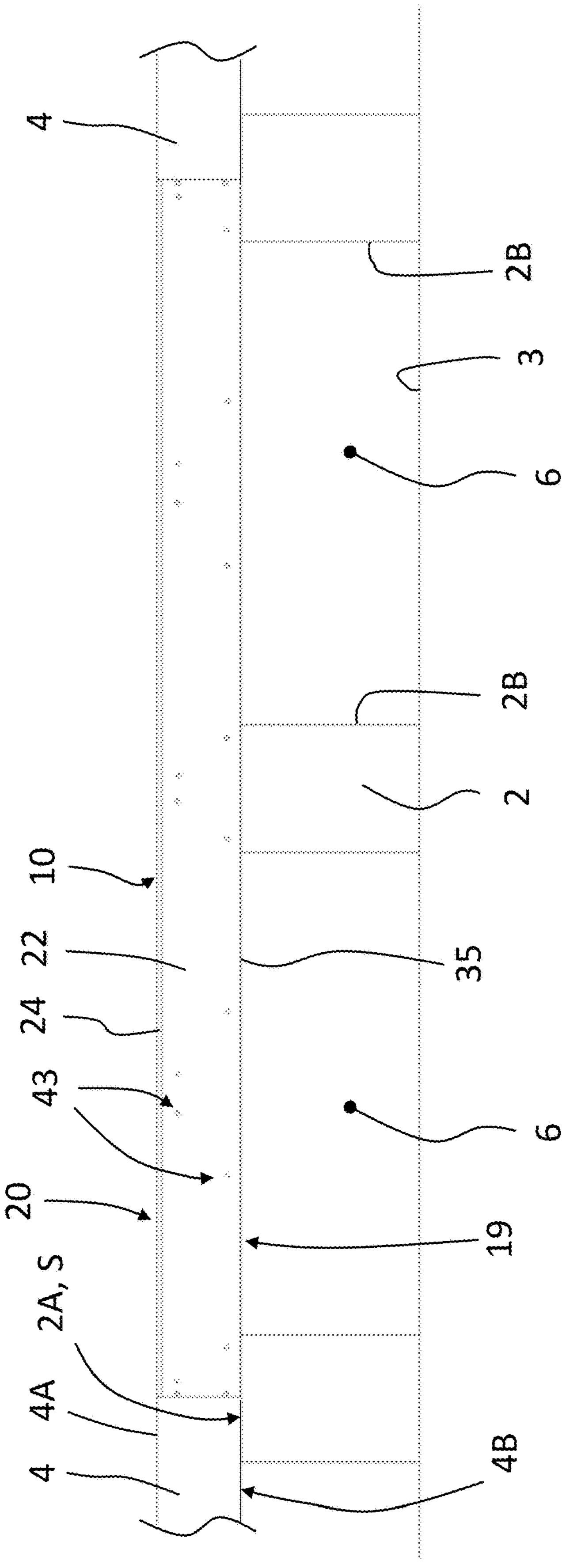
FIG. 3 is a partial end view of the ventilated concrete floor structure of FIG. 1.
Figure 4:
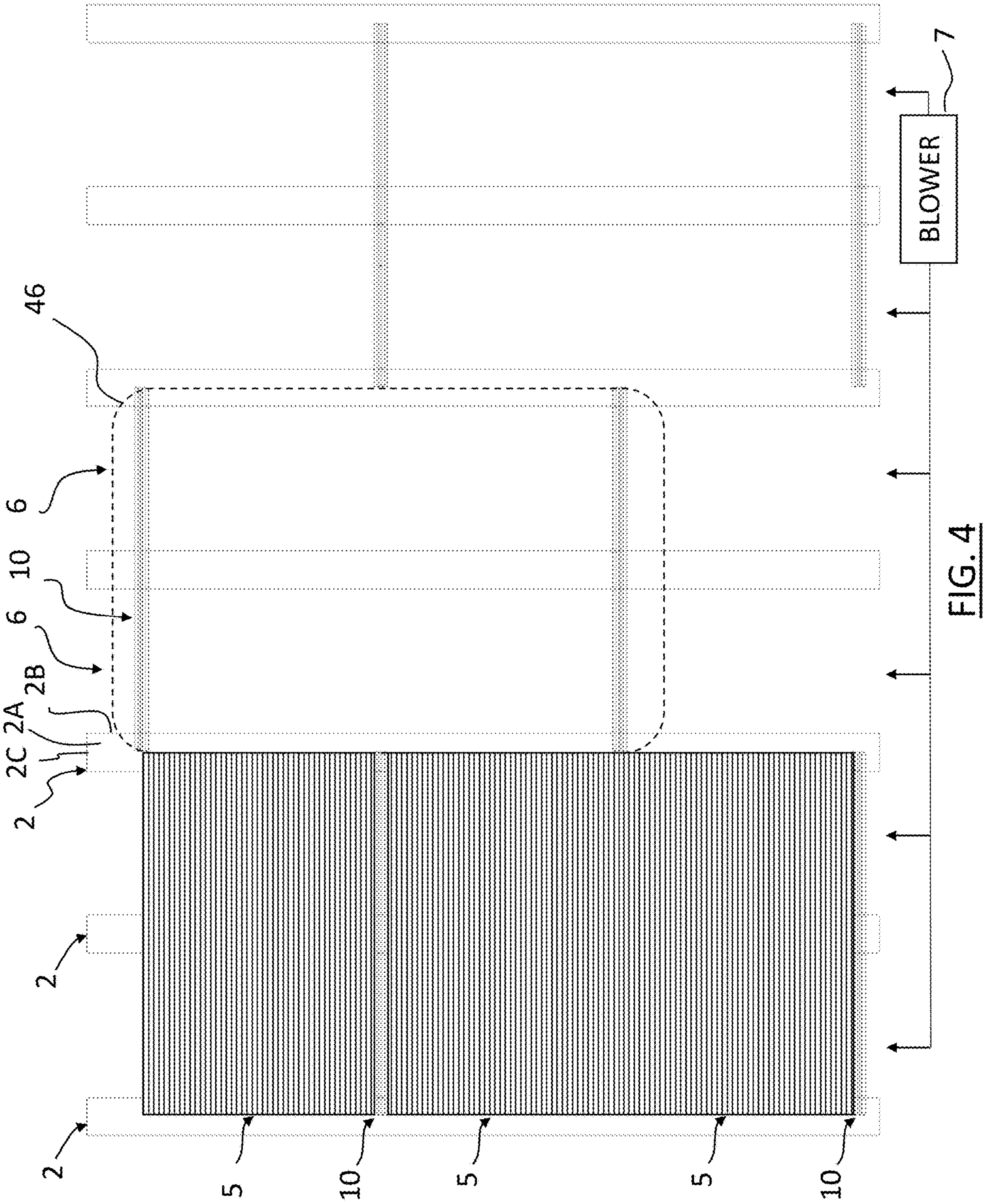
FIG. 4 is a top view of the ventilated concrete floor structure of FIG. 1 without the concrete floor and showing only some sheets of cladding to show underlying components.
Figure 7:
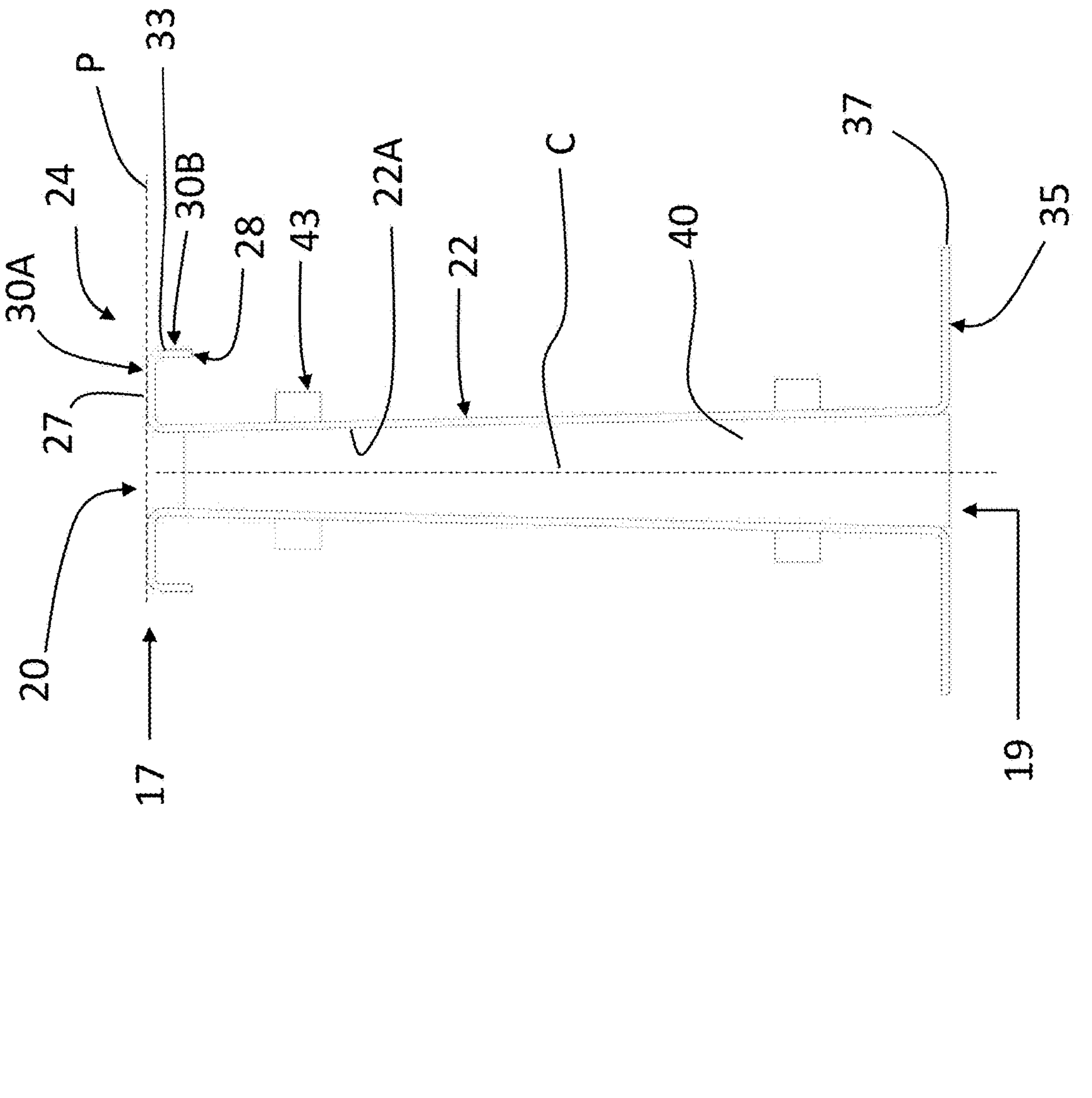
FIG. 7 is an end view of the vent of FIG. 5.

To maintain their spaced-apart condition, the sidewalls are interconnected by bridging members 40 disposed at longitudinally spaced positions of the sidewalls. In the illustrated arrangement, the bridging members 40 are inverted V-shaped so as to act as flow restrictors to passively spread airflow passing from the inlet opening 19 to the outlet opening 20 relative to the longitudinal direction of the vent. Thus, the flow restrictors 40 inserted in the passageway 12 and structurally interconnecting the sidewalls 14 form a series of ducts within the passageway 12 with smaller inlets and larger outlets to cause the airflow to spread or diverge upon release to the ventilated space from the outlet opening 20 at the top of the vent. The flow restrictors 40 are attached to the sidewalls 14 via integral tabs 43 passed through slotted apertures in the upright portions of the sidewalls, which tabs 43 are more clearly shown in FIGS. 3 and 7.

The bridging members 40, which span a majority of the height of the passageway, in other words substantially the full height of the sidewalls from the bottoms to the tops thereof, select ones of the members 40 closest to the sidewall ends 15 act to close the passageway 12 on opposite sides in the height direction.

Figure 10:
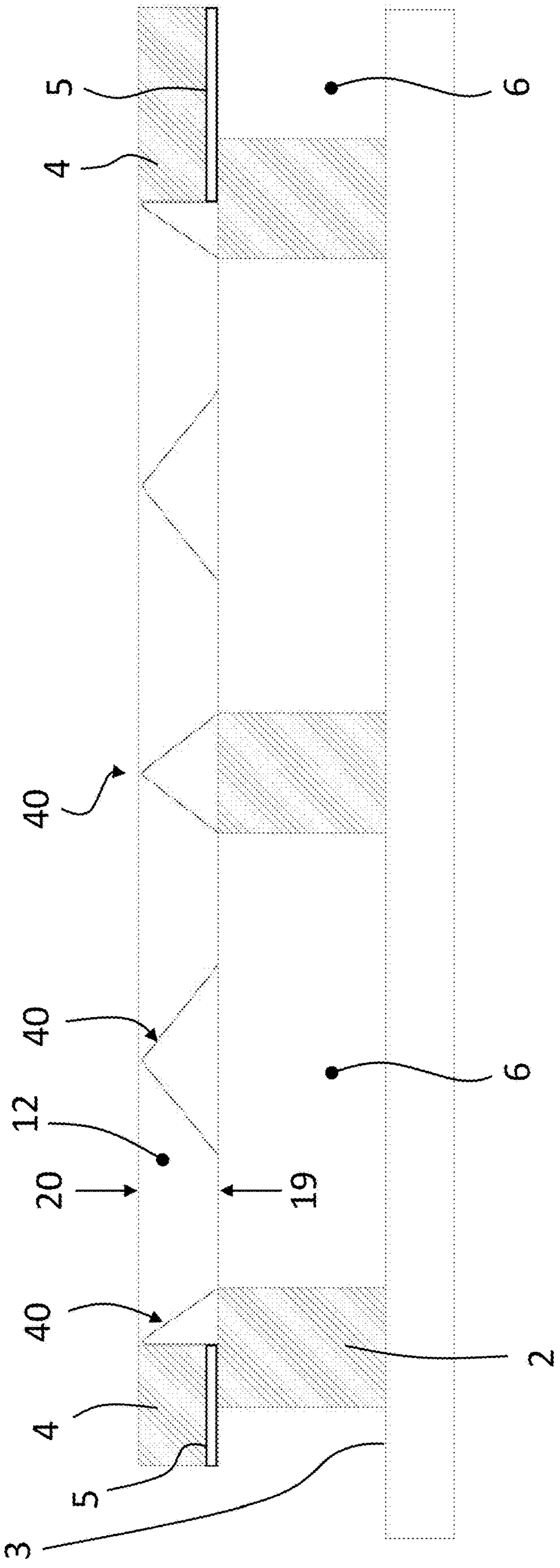
FIG. 10 is a cross-sectional view along line 10-10 in FIG. 2.

Furthermore, as more clearly shown in FIG. 10, the flow restrictors 40 are at longitudinally spaced positions, select ones of which, in particular endmost ones of the restrictors closest to the sidewall ends 15 and intermediate one(s), are arranged to register with the support beams underneath the vent 10, from which there is no upward airflow.

Since the sidewalls 14 are parallel to each other, the vent 10 has a generally (capital letter) I-shaped in lateral or transverse cross-section, with a lower end of the (capital letter) "I" being wider than an upper end of the (capital letter) "I."

Since the opposite sidewalls 14 are identical in construction, the inlet and the outlet openings 19, 20 of the passageway 12 have a common length in the longitudinal direction but different widths.

Also, it will be appreciated that each of the sidewalls 14 is unitary such that the upright portion 22, the upper portion 24 and the lower portion 35 are integrally formed.

In the illustrated arrangement, the vent 10 is of relatively simple construction, consisting essentially of the sidewalls, shaped to form the relevant portions, namely the upright portions, the upper portions and the lower portions, and the interconnecting members which carry integral locking tabs passed through mating apertures in the sidewalls.

In the illustrated arrangement, dimensions of the vent 10 are as follows:

Length: 96 inches
Height: 6.5 inches
Top width: 2 inches (upper portion)
Inlet opening width: ⅞ inches
Outlet opening width: ⅝ inches Preferably, a width of the outlet opening lies in a prescribed range from ½ inches to ⅞ inches. This prevents crops such as potatoes, and in particular creamers which are a type of small potato, from falling into the passageway through the outlet opening.

This provides an arrangement of vent which is configured to resist chipping of a surrounding portion of the cast concrete floor, which encompasses the vent, as the upper surfaces of the vent on either side of the outlet can be presented flush with the upper surface of the surrounding concrete floor.

This also provides an arrangement of vent which is easier to clean by pushing debris in the passageway through the inlet and into the air duct for subsequent removal.

There is also disclosed herein a novel method of forming a ventilated concrete floor structure, which comprises the following steps:

providing, on an underlying support surface 3, a plurality of longitudinally-extending support beams 2 with planar upper surfaces 2A in substantially parallel relation to each other and spaced apart in a lateral direction crosswise to a longitudinal direction of the beams, such that the upper surfaces 2A of the support beams lie in a common plane to collectively define a common support surface S for a concrete floor 4 to be cast thereover;

providing a plurality of vents 10 configured for releasing air from air channels 6 formed between adjacent pairs of the support beams;

mounting the vents in an array to the support beams with the vents rested on the upper surfaces of the support beams, where, in the array, the vents are arranged at spaced positions from each other across the common support surface of the support beams;

arranging, on the support beams, between the vents, cladding 5 configured to support the concrete floor 4, so as to close tops of the air channels to form air ducts 6; and casting the concrete floor 4 on the cladding between the vents.

The support beams are arranged in a laterally-extending row, relative to the longitudinal direction of the beams, or otherwise in an array of the beams in which the beams are generally in spaced side-by-side relation in the lateral direction.

In the vent array, the vents 10 are arranged to be elongated in the lateral direction and to span between an adjacent set of two or more of the support beams. In the illustrated arrangement, the vents span an adjacent set of more than two support beams.

In the illustrated arrangement of ventilated concrete floor structure, the vents, in the array, are arranged in a plurality of longitudinally extending rows 46 in which respective ones of the vents in each row are staggered relative to the vents of an adjacent one of the rows.

As more clearly shown in FIG. 10, each of the vents 10 is arranged to extend from a lateral center of first one of the beams of an adjacent set thereof to a lateral center of a last one of the beams of the adjacent set. Therefore, the respective vents of adjacent rows of the array are arranged in non-overlapping condition relative to the lateral direction. In other words, there is no overlapping in the lateral direction of vents in different longitudinal rows.

Only a portion of the passageway 12 of the respective vent, which overlies one of the air channels receives ventilating airflow, which portion is formed between an adjacent pair of flow restrictors 40.

Typically, mounting the vents 10 in the array comprises arranging the vents 10 on the support beams 2 and fastening the vents directly thereto. Fasteners may be passed into the support beams through the lower portions 35 of the sidewalls.

Typically, arranging the cladding on the support beams between the vents comprises laying or placing the cladding in substantially horizontal orientation, which orientation conforms to the common support surface S which is substantially horizontal. Optionally, the cladding may be fastened or anchored to the support beams.

The vents 10 are provided having the same length as first dimensions of the cladding, which is provided in the form of uniform rectangular sheets. As such, the sheets of cladding are arranged in a row of the sheets between an adjacent pair of the vents in a common one of the rows of the vent array, with the first dimensions of the sheets aligned relative to the vents. Thus, the sheets of the cladding are laid as fabricated or manufactured or otherwise provided, without cutting to fit or accommodate the vents. If the spacing between an adjacent pair of vents in a common longitudinal row of the vent array is not a multiple of a second dimension of the cladding sheets, then arranging cladding on the support beams between the vents comprises overlapping the sheets of the cladding, typically in the longitudinal direction of the support beams. This further reduces cutting such that the method of forming the ventilated concrete floor structure may be faster.

This provides fewer steps to forming the ventilated concrete floor structure, as the vents are mounted directly to the support beams, the upper surfaces of which are coplanar, and the cladding is placed directly on the support beams, such that these components by virtue of placing on the support beams are arranged level for concrete pouring.

The scope of the claims should not be limited by the preferred embodiments set forth in the examples but should be given the broadest interpretation consistent with the specification as a whole.

The invention claimed is:

1. A vent for a ventilated concrete floor structure, wherein the ventilated concrete floor structure comprises a plurality of support beams in substantially parallel spaced apart relation on an underlying support surface, a cast concrete floor formed over the support beams and a plurality of air channels respectively between adjacent pairs of the support beams and arranged to be substantially covered by the concrete floor to form air ducts, the vent comprising:

a pair of upstanding longitudinally-extending sidewalls interconnected in spaced-apart relation in a width direction of the vent crosswise to a longitudinal direction;

a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;

wherein the sidewalls have upright portions between the tops and the bottoms thereof and extending in the height direction therebetween;

wherein the sidewalls are made of metallic material;

wherein the sidewalls include upper portions defining the tops thereof, wherein the upper portions extend outwardly from the upright portions in the width direction so as to provide upper surfaces at the tops of the sidewalls and beside the outlet opening that are arranged substantially flush with the upper surface of the cast concrete floor;

and wherein the upper portions are hooked so as to extend outwardly from the upright portions and then downwardly towards the bottoms of the sidewalls, such that upper terminal edges of the sidewalls defined by the upper portions are below the tops of the sidewalls.

2. The vent of claim 1 wherein, when the upper portions comprise outwardly-extending portions extending substantially horizontally outwardly and depending portions extending therefrom and towards the bottoms of the sidewalls and when the depending portions define the upper terminal edges, the outwardly-extending portions define the upper surfaces of the sidewalls which are respectively planar and which lie in a common plane.

3. The vent of claim 1 wherein, when the upper portions comprise outwardly-extending portions extending substantially horizontally outwardly and depending portions extending therefrom and towards the bottoms of the sidewalls and when the depending portions define the upper terminal edges, transitions between the outwardly-extending portions and the depending portions are rounded such that outer surfaces of the upper portions between the outlet opening and the upper terminal edges, including the upper surfaces of the sidewalls, are curved.

4. The vent of claim 1 wherein the sidewalls are spaced by a plurality of bridging members at spaced positions along the longitudinal direction and wherein the bridging members have a V-shape in a cross-section in the width direction with an apex of the V-shape facing upwardly.

5. The vent of claim 1 wherein the sidewalls include lower portions defining the bottoms thereof and extending outwardly from the upright portions in the width direction to form feet for resting on the support beams.

6. The vent of claim 5 wherein, when the upper portions include outwardly-extending portions extending substantially horizontally from the upright portions and defining the upper surfaces of the sidewalls, the lower portions extend further horizontally outwardly than the upper portions from the upright portions.

7. The vent of claim 1 wherein the passageway is trapezoidal in shape-such that the inlet and outlet openings are rectangular in plan and the inlet opening is wider than the outlet opening in the width direction of the vent.

8. The vent of claim 1 wherein the sidewalls are arranged in the longitudinal direction to span an adjacent set of more than two of the plurality of support beams.

9. A vent for a ventilated concrete floor structure, wherein the ventilated concrete floor structure comprises a plurality of support beams in substantially parallel spaced apart relation on an underlying support surface, a concrete floor thereover and a plurality of air channels respectively between adjacent pairs of the support beams and arranged to be covered by the concrete floor to form air ducts, the vent comprising:

a pair of upstanding longitudinally-extending sidewalls interconnected in spaced-apart relation in a width direction of the vent crosswise to a longitudinal direction;

a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;

wherein the passageway is trapezoidal in shape-such that the inlet and outlet openings are rectangular in plan and the inlet opening is wider than the outlet opening in the width direction of the vent.

10. The vent of claim 9 wherein the sidewalls are arranged in the longitudinal direction to span an adjacent set of more than two of the plurality of support beams.

11. The vent of claim 9 wherein:

wherein the sidewalls have upright portions between the tops and the bottoms thereof and extending in the height direction therebetween;

wherein the sidewalls are made of metallic material; and wherein the sidewalls include upper portions defining the tops thereof, wherein the upper portions extend outwardly from the upright portions in the width direction so as to provide upper surfaces at the tops of the sidewalls and beside the outlet opening that are arranged substantially flush with the upper surface of the cast concrete floor.

12. The vent of claim 9 wherein the sidewalls are spaced by a plurality of bridging members at spaced positions along the longitudinal direction and wherein the bridging members have a V-shape in a cross-section in the width direction with an apex of the V-shape facing upwardly.

13. The vent of claim 9 wherein the sidewalls include lower portions defining the bottoms thereof and extending outwardly from the upright portions to form feet for resting on the support beams.

14. A method of forming a ventilated concrete floor structure, the method comprising:

providing a plurality of longitudinally-extending support beams with planar upper surfaces in substantially parallel relation to each other and spaced apart in a lateral direction crosswise to a longitudinal direction, wherein the upper surfaces of the support beams lie in a common plane to collectively define a common support surface for a concrete floor to be cast thereover;

defining between the beams air channels for passage therebetween of ventilation air therealong;

providing a plurality of air discharge vents configured for releasing air from air channels, wherein the vents are arranged to be elongated in the lateral direction and to span between an adjacent set of two or more of the plurality of longitudinally extending support beams;

each of the air discharge vents having an inlet opening at a bottom for communication with the air channels and an outlet opening at a top for release of the air;

mounting the vents to the support beams in an array of the vents with the vents rested on the upper surfaces of the support beams, wherein in the array the vents are arranged at spaced positions from each other across the common support surface of the support beams in a plurality of longitudinally extending rows;

arranging, on the support beams, between the rows of the air discharge vents, cladding configured to support the concrete floor;

wherein the cladding comprises substantially uniform rectangular sheets;

arranging each sheet of the cladding on the support beams with a width in the longitudinal direction equal to a spacing between the rows such that each sheet extends between an adjacent pair of the rows of air discharge vents and so that edges of the sheet are arranged at the air discharge vents in the row;

and casting the concrete floor on the cladding between the air discharge vents to a thickness to define a top surface of the concrete;

wherein each of the air discharge vents has a height equal to a thickness of the concrete so that the outlet opening at the top is at the top surface of the concrete.

15. The method of claim 14 wherein the vents have a length in the lateral direction which is substantially equal to a length of the rectangular sheets of cladding in the lateral direction.

16. The method of claim 14 wherein the air discharge vents, in the array, are arranged in a plurality of longitudinally extending rows in which respective ones of the air discharge vents in each row are staggered relative to the air discharge vents of an adjacent one of the rows.

17. The method of claim 16 wherein the respective air discharge vents of adjacent ones of the rows of the array are arranged in non-overlapping condition relative to the lateral direction.

18. The method of claim 14 wherein the air discharge vents are arranged to span more than two adjacent beams of the plurality of support beams.

19. The method of claim 14 wherein each air discharge vent comprises:

a pair of upstanding longitudinally-extending sidewalls interconnected in spaced-apart relation in a width direction of the vent crosswise to a longitudinal direction;

a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;

wherein the sidewalls have upright portions between the tops and the bottoms thereof and extending in the height direction therebetween;

wherein the sidewalls are made of metallic material;

wherein the sidewalls include upper portions defining the tops thereof, wherein the upper portions extend outwardly from the upright portions in the width direction so as to provide upper surfaces at the tops of the sidewalls and beside the outlet opening that are arranged substantially flush with the upper surface of the cast concrete floor;

wherein the upper portions are hooked so as to extend outwardly from the upright portions and then downwardly towards the bottoms of the sidewalls, such that upper terminal edges of the sidewalls defined by the upper portions are below the tops of the sidewalls.

20. The method of claim 14 wherein each air discharge vent comprises:

a pair of upstanding longitudinally-extending sidewalls interconnected in spaced-apart relation in a width direction of the vent crosswise to a longitudinal direction;

a passageway between the interconnected sidewalls for releasing air from at least one of the air ducts and to a ventilated space over the concrete floor, wherein the passageway has an inlet opening at bottoms of the interconnected sidewalls and arranged to be communicated with said at least one of the air ducts and an outlet opening at tops of the interconnected sidewalls arranged above the bottoms thereof relative to a height direction of the vent, crosswise to the width and longitudinal directions, and wherein the tops of the sidewalls are arranged at an upper surface of the cast concrete floor;

wherein the passageway is trapezoidal in shape-such that the inlet and outlet openings are rectangular in plan and the inlet opening is wider than the outlet opening in the width direction of the vent.

* * * * *